Patented Feb. 13, 1923.

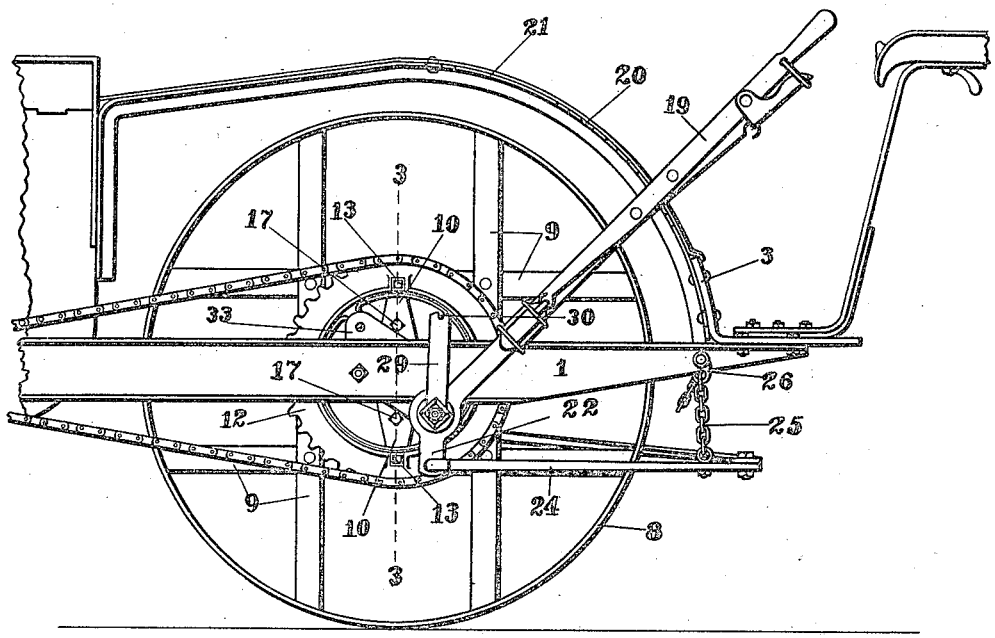
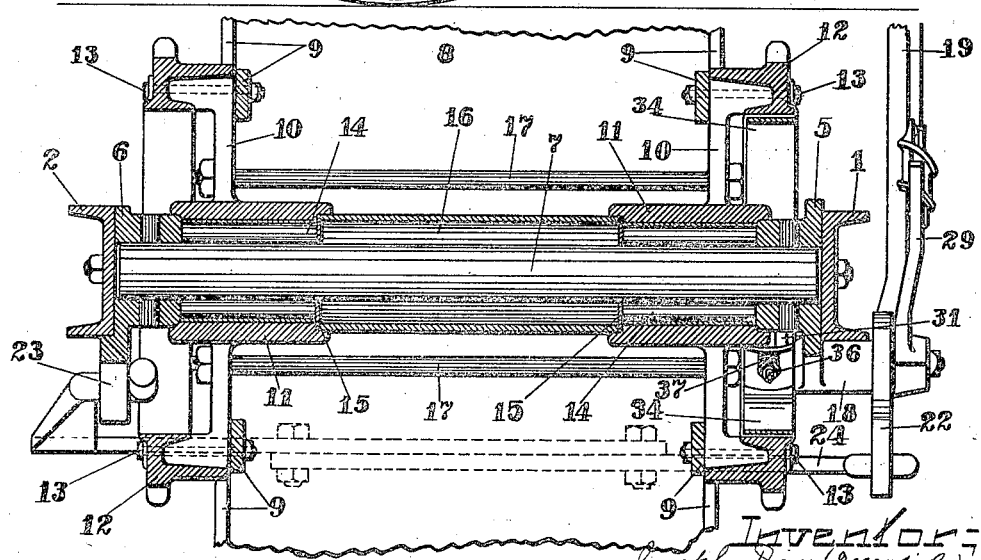

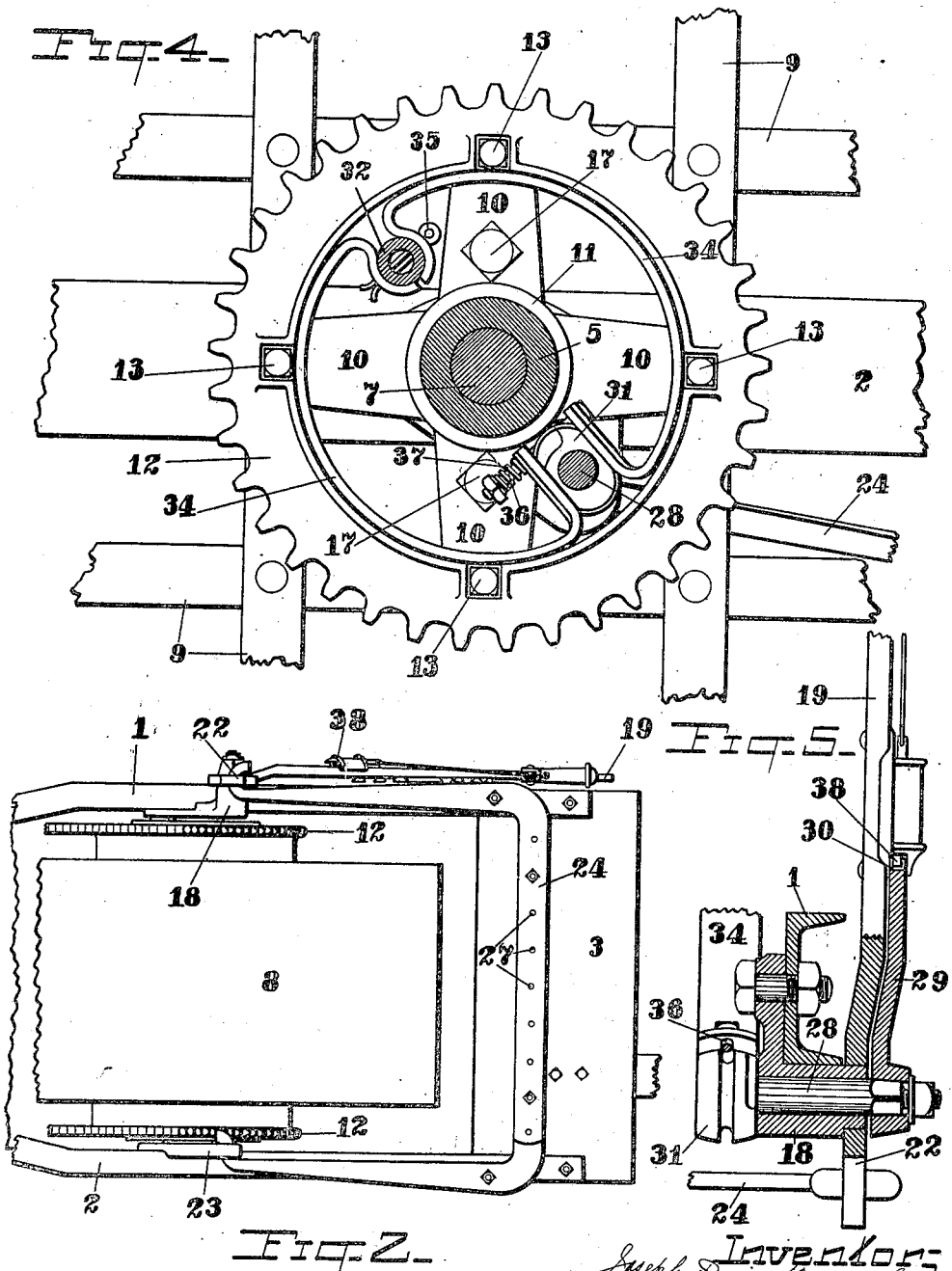

1,444,904

UNITED STATES PATENT OFFICE.

JOSEPH DAIN, DECEASED, LATE OF MOLINE, ILLINOIS, BY JOSEPH DAIN, JR., ADMINISTRATOR, OF MOLINE, ILLINOIS, ASSIGNOR TO DEERE & COMPANY, OF MOLINE, ILLINOIS, A CORPORATION OF ILLINOIS.

CLEVIS FOR TRACTORS.

Application filed January 10, 1918. Serial No. 211,276.

*To all whom it may concern:*

Be it known that JOSEPH DAIN, late a citizen of the United States, and a resident of Moline, in the county of Rock Island and State of Illinois, did invent certain new and useful Improvements in Clevises for Tractors, of which the following is a specification, reference being had therein to the accompanying drawing.

My invention relates to tractor hitch arranged so as to be adjustable, for purposes hereinafter described, and adapted more particularly for connecting plows with a tractor. The object of my invention being to provide a device that is simple and effective in operation and which is adjustable while the operation of plowing is in progress.

Referring to the drawings in which similar numerals indicate identical parts—

Figure 1 is a side elevation of the rear portion of a tractor showing my device mounted thereon.

Figure 2 is a bottom plan view of Figure 1.

Figure 3 is a transverse sectional detail on the line 3—3 of Figure 1.

Figure 4 is a detail of the brake, and

Figure 5 is a detail in part section of the lever and connected parts.

I have shown in the drawings sufficient of a tractor necessary to fully illustrate the application of my invention. The tractor frame consists preferably of channel bars 1 and 2, connected at their rear ends by a transverse plate 3 which form a support for the seat of the operator. Bearings 5 and 6 are rigidly mounted on the frame bars 1 and 2 respectively for the support of an axle 7 on which is mounted, to freely revolve thereon, a wheel 8 having lattice spokes 9 on both sides securely riveted together and to the tire of the wheel. On each side of the wheel 8 and secured to the spokes 9 are spokes 10 extending radially from hubs 11; the ends of the spokes 10 are projected outwardly and to the outward projections are secured sprockets 12, suitable bolts 13 passing through the rims thereof, the ends of the spokes 10, and the spokes 9, holding the parts rigidly together. The hubs 11 are fitted with roller bearings 14, the latter being held in place by the bearings 5 and 6, which project within a countersunk portion of the hubs 11, and washers 15 which are retained in position by a cylindrical member 16, the inner ends of the hubs being countersunk for the washers 15 and the ends of the cylindrical member 16. Stay bolts 17 extend from side to side of the wheel 8 and are secured to the spokes 10, adding to the rigidity of the structure.

Extending outwardly from the bearing 5 is a projection 18 on which is pivotally mounted a lever 19 which is adapted to engage with any one of a series of notches 20 in the edge of a hood 21 covering the wheel 8. Integral with the lever 19, and extending downwardly therefrom is an arm 22. A yoke shaped hitch element 24 formed of two forwardly extending arms connected by a transverse hitch bar, has the end of one arm hooked, to move freely, in a downwardly projecting arm in the bearing 6; the opposite arm is permanently hooked to the arm 22 of the lever 19. Both arms of the yoke terminate in substantially the same plane.

The element 24 extends horizontally rearward where it is supported by chains 25 secured at opposite sides thereof and adapted to engage with hooks 26 secured on the frame bars 1 and 2 to facilitate mounting. When an implement or other object to be drawn is attached to the hitch element 24, the links of the chains 25 are usually adjusted upon the hooks 26 so the chains will be slack when said element is under tension, in order that said element will be free to rise and fall and permit relative vertical movement between the tractor and the implement, due to inequalities in the ground surface, but when so adjusted the chains act as a stop to limit the downward movent of said element, and prevent its engagement with the ground if the tractor is backed. The hitch 24 is preferably made of dual parts, one overlapping the other for a portion of their lengths, and rigidly secured together by suitable bolts, and provided with suitable holes 27 to any one of which one or more plows can be attached.

As before stated the hitch element 24 is hooked in an arm 23 forming at that point a stationary pivot, and as the opposite end of the element 24 is engaged with the arm 22 of the lever 19, below the pivot of the latter, is follows that, by operating the lever 19, the hitch element 24 can be swung on its pivotal connection with the arm 23, in a lateral direction, and the plow or plows will be guided by this lateral movement of the element to take more land, or to relinquish more land, depending upon the direction in which the element is swung.

It is sometimes necessary, when the tractor is on a down grade, to provide a means of controlling the speed of travel of the machine, and I have found it of advantage to utilize the lever 19 for the purpose of actuating a brake mechanism, hereafter described, simultaneously with the lateral adjustment of the hitch element, the lever being normally disconnected from the brake mechanism, and connectible thereto at the will of the operator.

A stub shaft 28 is journaled in the projection 18 which is bored for that purpose. On the outer end of the stub shaft 28 is mounted an arm 29 having in its free end a notch 30. Rigidly mounted on the inner end of the stub shaft 28 is a cam 31. Inside the sprocket 12 adjacent frame bar 1 is a stud 32 mounted on a projection 33 of the bearing 5. Friction bands 34, having one of their ends bent to clasp the stud 32 and secured thereon by a cotter 35, are disposed within the sprocket and are adapted to be moved at will into contact with the inner surface of the sprocket rim by the cam 31 when the latter is turned, the cam 31 normally having its smaller diameter between and in contact with parallel ends of the friction bands 34. A bolt 36 passes through the parallel ends of the friction bands 34, and has confined in one end a coil spring 37 which exerts its force against the adjacent end of one of the friction bands 34 and a nut on the end of the bolt.

A latch of a common type, is provided on the lever 19, and includes a dog 38 which is adapted to engage with the notch 30 in the arm 29 when it is desired to operate the brake.

As before explained the hitch element 24 is swung by operation of the lever 19; when it becomes necessary to apply the brake the lever is moved until the dog 38 is engaged with the notch 30 in the arm 29, then a movement of the lever in either direction will simultaneously rock the arm 29 and turn the cam 31, spreading the friction bands against the sprocket rim and creating the friction to retard the speed of rotation of the wheel 8. I do not confine myself to the specific construction of the brake shown, as different types of brakes may be employed and operated at will by the same lever which controls the lateral movement of the hitch element 24.

What I claim is—

1. A draft device for tractors, comprising a rigid yoke shaped hitch element horizontally disposed and having its ends pivotally supported at opposite points on a tractor, and means to swing said element laterally on one of its pivoted ends.

2. In a draft device for tractors, the combination of a rigid yoke shaped hitch element pivotally supported on the tractor to swing both vertically and laterally, a lever pivotally supported on the tractor and connected to the hitch element and operable to swing said element laterally.

3. In a draft device for tractors, the combination of a rigid yoke shaped hitch element pivotally supported on the tractor to swing both vertically and laterally, a lever pivotally supported on the tractor and connected to the hitch element and operable to swing said element laterally, and means to limit the downward movement of said element.

4. A draft device for tractors, comprising a rigid yoke shaped hitch element horizontally disposed and having one of its ends only pivotally supported on a tractor, and a lever pivotally supported on the tractor, the opposite end of said element being pivotally connected to the lever whereby said element is adapted to be swung laterally by operation of the lever.

5. In a draft device for tractors, the combination of a hitch element pivotally supported on the tractor, a lever pivotally supported on the tractor and connected to said element and operable to swing said element laterally, a brake for one of the tractor wheels and means to operate said brake simultaneously with the lateral swing of the element.

6. In a draft device for tractors, the combination of a hitch element pivotally supported on opposite sides of the tractor, a brake, a lever pivotally supported on the tractor and permanently connected to the hitch element and operable to swing said element laterally, and means to connect the brake with said lever at will whereby the brake is operated simultaneously with the lateral swing of said element.

7. A draft device for tractors comprising a yoke having a transverse hitch bar and two rigid arms one with its end pivoted to the tractor and the other having its end pivotally supported on the tractor and longitudinally adjustable, and means for positively swinging the transverse bar of the yoke and locking it in adjusted position.

8. The combination with a tractor having a rear supporting element, a draft device comprising a yoke having a transverse hitch bar and two rigid arms, said arms pivotally supported at their front ends on the tractor adjacent the transverse vertical plane of said supporting element, and means to adjust one of said arms longitudinally to positively swing the transverse bar of the yoke and lock it in adjusted position.

9. The combination with a tractor, of a transversely arranged hitch bar having forwardly extending arms integral therewith and carried by the tractor, and means for positively moving said bar transversely and longitudinally of the tractor and locking it under adjustment.

10. The combination with a tractor having in the central longitudinal vertical plane thereof an element positioned relatively near the ground surface, a vertically swinging hitch device comprising two bars at the sides of and extending backward from the centrally positioned tractor element, a transversely positioned bar connecting the two aforesaid bars, and means for positively moving one of the longitudinally arranged bars longitudinally of the tractor and for locking it under adjustment.

11. The combination with a tractor, of the frame thereof, a tractor element positioned near the ground surface, a transversely arranged hitch bar, two longitudinally extending bars rigidly connected to the hitch bar and pivotally mounted at their ends on the frame in the transverse vertical plane of the tractor element, and means on the tractor for positively moving the hitch bar transversely and longitudinally.

In testimony whereof, I affix my signature, in the presence of two witnesses.

JOSEPH DAIN, JR.,
*Administrator of the estate of Joseph Dain, deceased.*

Witnesses:
W. G. DUFFIELD,
JESSIE SIMSER.